United States Patent
Satou

(10) Patent No.: US 10,623,095 B2
(45) Date of Patent: Apr. 14, 2020

(54) SIGNAL DETECTION DEVICE AND SIGNAL DETECTION METHOD

(71) Applicant: NEC CORPORATION, Tokyo (JP)

(72) Inventor: Yoshirou Satou, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/174,538

(22) Filed: Oct. 30, 2018

(65) Prior Publication Data

US 2019/0074897 A1 Mar. 7, 2019

Related U.S. Application Data

(63) Continuation of application No. 15/914,232, filed on Mar. 7, 2018, now abandoned, which is a
(Continued)

(30) Foreign Application Priority Data

Sep. 25, 2014 (JP) .................................. 2014-195313

(51) Int. Cl.
  *H04B 10/079* (2013.01)
  *H04J 14/00* (2006.01)
  (Continued)

(52) U.S. Cl.
  CPC ..... *H04B 10/07955* (2013.01); *H04B 10/079* (2013.01); *H04J 14/00* (2013.01);
  (Continued)

(58) Field of Classification Search
  CPC ........... H04B 10/07955; H04B 10/079; H04B 10/08; H04B 10/60; H04B 10/032;
  (Continued)

(56) References Cited

U.S. PATENT DOCUMENTS

| 5,712,716 A | * | 1/1998 | Vanoli | .................. | H04B 10/077 398/26 |
| 5,783,969 A | | 7/1998 | Luz | | |

(Continued)

FOREIGN PATENT DOCUMENTS

| CN | 103326777 A | 9/2013 |
| CN | 103731228 A | 4/2014 |

(Continued)

OTHER PUBLICATIONS

Communication dated Nov. 27, 2018 from the State Intellectual Property Office of the P.R.C. in application No. 201580051735.x.
(Continued)

*Primary Examiner* — Abbas H Alagheband
(74) *Attorney, Agent, or Firm* — Sughrue Mion, PLLC

(57) ABSTRACT

A signal detection device including: a comparison unit that obtains data including central frequencies of optical signals respectively transmitted by a plurality of optical transmitters and a central frequency interval indicating the interval between the central frequencies, power measurement values obtained by measuring, at sampling point frequencies arranged at a prescribed sampling interval, the power of a WDM signal for which the wavelength of optical signals has been multiplexed, a sampling interval, and sampling point frequencies, that selects a selection value from among the power measurement values on the basis of the central frequency interval and the sampling interval, and that outputs a result of comparison between the selection value and a prescribed threshold; and an alarm generator that outputs a signal interruption alarm in a case where the comparison result indicates that the selection value is less than the threshold.

18 Claims, 7 Drawing Sheets

Related U.S. Application Data continuation of application No. 15/512,323, filed as application No. PCT/JP2015/004675 on Sep. 14, 2015, now Pat. No. 9,941,961.

(51) Int. Cl.
  *H04J 14/02* (2006.01)
  *H04Q 11/00* (2006.01)
  *H04B 10/032* (2013.01)
  *H04B 10/075* (2013.01)
  *H04B 10/00* (2013.01)

(52) U.S. Cl.
  CPC .......... *H04J 14/02* (2013.01); *H04J 14/0221* (2013.01); *H04B 10/032* (2013.01); *H04B 10/075* (2013.01); *H04B 10/152* (2013.01); *H04Q 11/00* (2013.01)

(58) Field of Classification Search
  CPC .. H04B 10/075; H04B 10/158; H04B 10/152; H04J 14/00; H04J 14/02; H04J 14/0221; G01J 3/28; G02B 6/28; G02B 6/34; G02B 6/12; H04Q 7/20; H04Q 11/00
  USPC .................. 398/34, 79, 83; 385/37
  See application file for complete search history.

(56) References Cited

U.S. PATENT DOCUMENTS

| | | | |
|---|---|---|---|
| 5,808,762 A * | 9/1998 | Vanoli | H04B 10/077 398/79 |
| 5,943,147 A * | 8/1999 | Vanoli | H04B 10/077 398/27 |
| 6,204,959 B1 | 3/2001 | Fujita et al. | |
| 6,707,550 B1 | 3/2004 | Georgis et al. | |
| 6,753,958 B2 * | 6/2004 | Berolo | G01J 3/0259 356/328 |
| 7,171,161 B2 | 7/2007 | Miller | |
| 7,257,288 B1 | 8/2007 | Strasser et al. | |
| 7,408,639 B1 | 8/2008 | Strasser et al. | |
| 7,952,695 B2 * | 5/2011 | Crafts | G01J 3/18 356/73.1 |
| 7,982,943 B2 * | 7/2011 | Okuno | G02F 1/3513 359/326 |
| 8,054,537 B2 * | 11/2011 | Okuno | G02F 1/3513 359/326 |
| 8,103,168 B1 | 1/2012 | Enoch et al. | |
| 8,618,966 B2 | 3/2013 | Kanter et al. | |
| 8,514,390 B2 * | 8/2013 | Tiao | G01N 15/1434 356/237.5 |
| 8,699,009 B2 * | 4/2014 | Li | G01B 11/18 356/33 |
| 9,106,488 B1 | 8/2015 | Haran | |
| 9,236,951 B2 | 1/2016 | Lowery et al. | |
| 9,640,866 B2 | 5/2017 | Kumar | |
| 9,723,385 B2 * | 8/2017 | Hu | H04Q 11/0005 |
| 9,917,650 B2 | 3/2018 | Liboiron-Ladouceur et al. | |
| 2003/0053175 A1 * | 3/2003 | Szczepanek | H04B 10/0797 398/164 |
| 2004/0023674 A1 | 2/2004 | Miller | |
| 2006/0153498 A1 * | 7/2006 | Shen | G02B 6/12019 385/24 |
| 2007/0206273 A1 * | 9/2007 | Ghera | H04J 14/02 359/337 |
| 2009/0028554 A1 | 1/2009 | Anderson et al. | |
| 2012/0328297 A1 * | 12/2012 | Hoshida | H04J 14/02 398/85 |
| 2013/0064542 A1 * | 3/2013 | Eiselt | H01S 5/0687 398/34 |
| 2013/0071122 A1 | 3/2013 | Sasaki | |
| 2013/0251365 A1 * | 9/2013 | Sone | H04B 10/07955 398/38 |
| 2013/0271772 A1 * | 10/2013 | Johnson | G01B 9/02004 356/479 |
| 2014/0161448 A1 * | 6/2014 | Kaburagi | H04J 14/0204 398/48 |
| 2014/0376909 A1 * | 12/2014 | Frisken | H04J 14/0227 398/26 |
| 2015/0155934 A1 * | 6/2015 | Nakagawa | H04B 10/0775 398/34 |
| 2015/0207583 A1 * | 7/2015 | Nakajima | H04J 14/0212 398/79 |
| 2016/0352449 A1 | 12/2016 | Honda | |
| 2017/0093499 A1 | 3/2017 | Liboiron-Ladouceur et al. | |
| 2017/0279529 A1 | 9/2017 | Satou | |

FOREIGN PATENT DOCUMENTS

| | | |
|---|---|---|
| EP | 2541821 A2 | 1/2013 |
| JP | 2010-130587 A | 6/2010 |
| JP | 2012-60308 A | 3/2012 |
| JP | 2013009238 A | 1/2013 |
| JP | 2014-165751 A | 9/2014 |

OTHER PUBLICATIONS

Communication dated May 9, 2018, from the European Patent Office in counterpart European Application No. 15844149.3.
International Search Report of PCT/JP2015/004675, dated Oct. 20, 2015. [PCT/ISA/210].
Written Opinion of PCT/JP2015/004675, dated Oct. 20, 2015. [PCT/ISA/237].

* cited by examiner

SIGNAL DETECTION DEVICE AND SIGNAL DETECTION METHOD

CROSS REFERENCE TO RELATED APPLICATIONS

This application is a Continuation Application of U.S. application Ser. No. 15/914,232, filed Mar. 7, 2018, which is a Continuation of U.S. application Ser. No. 15/512,323, filed Mar. 17, 2017, now U.S. Pat. No. 9,941,961 which issued Apr. 10, 2018, which is a National Stage of International Application No. PCT/JP2015/004675, filed Sep. 14, 2015, claiming priority based on Japanese Patent Application No. 2014-195313, filed Sep. 25, 2014, the contents of all of which are incorporated herein by reference in their entirety.

TECHNICAL FIELD

The present invention relates to a signal detection device and a signal detection method, and more particularly, to a signal detection device and a signal detection method for detecting whether or not an optical signal is present for each channel, in optical signals subjected to wavelength division multiplexing.

BACKGROUND ART

With recent spread of the Internet, services for handling a large volume of content, such as video, have been rapidly expanded. As a result, a capacity of an optical communication system, which is a backbone network, has also been increasing. In such a large capacity communication system, it is important to efficiently utilize limited optical spectral regions.

In a wavelength division multiplexing (WDM) technique used in an optical communication system, one carrier (carrier wave) is generally disposed in each channel in certain center frequency intervals. Such a configuration of channels is defined by a frequency grid. A frequency grid with the center frequency interval of channels of 50 GHz, for example, is referred to as a "50 GHz grid" in the following. Further, as for channels constituting a WDM signal, "a center frequency of a channel" and "a center frequency interval of channels" are hereinafter simply referred to as "a center frequency" and "a center frequency interval", respectively, unless otherwise specified.

Meanwhile, in order to increase a capacity of a transmission system, there is a demand for improving an accommodation efficiency of a WDM signal by changing the frequency grid to a frequency grid having an optimum center frequency interval in accordance with a transmission rate or a modulation method. For example, there is a demand for transmission of a WDM signal in which frequency grids having different center frequency intervals, such as a 50 GHz grid, a 37.5 GHz grid, and a 25 GHz grid, coexist.

In view of the above-mentioned circumstances, in ITU-T Recommendation G.694.1 defining frequency grids, in addition to a fixed grid, a flexible grid was standardized in 2012. ITU-T stands for the International Telecommunication Union Telecommunication Standardization Sector. In the flexible grid, a center wavelength of $193.1 + n \times 0.00625$[THz] (n is an integer) and a slot width of $12.5 \times m$[GHz] (m is a positive integer) are defined.

In connection with the present invention, PTL 1 describes an optical transmission apparatus including a channel monitor that outputs information about an operation channel. PTL 2 describes a signal light monitoring apparatus that receives split monitor light and determines whether or not signal light is present for each channel to be measured.

CITATION LIST

Patent Literature

[PTL 1] Japanese Laid-open Patent Publication No. 2010-130587 (paragraph [0126], FIG. 30)
[PTL 2] Japanese Laid-open Patent Publication No. 2012-060308 (paragraph [0010], FIG. 1)

SUMMARY OF INVENTION

Technical Problem

General methods for detecting an optical signal included in a WDM signal for each channel and problems in the methods will be described.

(1) Signal Detection Method Using Tap-PD

FIG. 5 is a diagram illustrating a signal detection method using a Tap-PD (Tap-photo diode). Transmitters N1 to NN are optical transmitters that transmit optical signals having different frequencies. A Tap-PD array 10 is disposed between the transmitters N1 to NN and an optical wavelength multiplexing unit 11. The Tap-PD is an optical device used to split part of an optical signal propagating through a transmission path and monitor power of the propagating optical signal. The Tap-PD array 10 is an optical device having a configuration in which a plurality of Tap-PDs are disposed in parallel. The Tap-PD array 10 includes PDs (photo diodes) respectively corresponding to the transmitters N1 to NN, and monitors power of optical signals respectively transmitted from the transmitters N1 to NN. The optical wavelength multiplexing unit 11 performs wavelength multiplexing on the optical signals respectively transmitted from the transmitters N1 to NN and outputs the optical signals as a WDM signal.

However, with recent increase in capacity of optical communication systems, the number of multiplexed wavelengths in a backbone transmission path generally exceeds 100 waves. Such communication systems need to be provided with a Tap-PD including 100 or more input/output terminals for optical signals and 100 or more monitor output terminals for electric signals. Accordingly, the detection method illustrated in FIG. 5 has a problem that the wire connection of the input/output terminals of the Tap-PD array 10 is complex and the circuit size increases, in a large capacity system.

(2) Signal Detection Method Using Spectroscopic OCM

FIG. 6 is a diagram illustrating a signal detection method using a spectroscopic OCM (optical channel monitor). In the drawings described below, the already-mentioned components are denoted by the same reference signs, and repeated descriptions are omitted unless they are necessary. The optical wavelength multiplexing unit 11 performs wavelength multiplexing on the optical signals respectively transmitted from the transmitters N1 to NN, and outputs the optical signals to an optical splitter 21. The optical splitter 21 splits part of the input light and outputs the split light to an OCM 22.

The OCM 22 is an OCM using a spectroscope and monitors power of the optical signals split by the optical splitter 21 for each channel (i.e., for each carrier). The optical signals split by the optical splitter 21 include all channel frequencies respectively transmitted from the transmitters N1 to NN. The OCM 22 measures a spectrum distribution of the frequencies of the input optical signals in the PD array 24 by using a spectroscope 23.

The spectroscope 23 can detect power of optical signals at a plurality of frequencies, but the frequency at which the power can be measured is fixed. Accordingly, the OCM 22 is required to use the spectroscope 23 in which the detected frequency corresponds to a specific fixed grid. This is because the OCM corresponding to the 50 GHz grid can detect optical signals having the same frequency as that of the 50 GHz grid among the optical signals of the 37.5 GHz grid and the 25 GHz grid, but cannot detect optical signals having a frequency different from that of the 50 GHz grid. Therefore, when frequency grids having different center frequency intervals coexist, the dedicated OCM 22 is required for each frequency grid.

(3) Signal Detection Method Using Variable Wavelength Filter OCM

FIG. 7 is a diagram illustrating a signal detection method using a variable wavelength filter OCM. The WDM signal output from the optical wavelength multiplexing unit 11 is split by the optical splitter 21. A variable wavelength filter OCM 32 monitors power of the optical signals split by the optical splitter 21 for each channel. The variable wavelength filter OCM 32 changes a transmissive frequency of a variable wavelength filter 33 and measures power of the transmissive optical signals by one PD 34 in certain frequency intervals.

A spectrum of an optical signal in each channel expands as a speed of the signal accelerate. Accordingly, a high-speed signal has a wide slot width. The slot width is a frequency width (wavelength width) that is necessary for transmission of an optical signal in one channel. In general, the slot width is substantially equal to the center frequency interval, and the spectrum of the optical signal has a range corresponding to a half of the slot width respectively before and after the center frequency. Further, when a wavelength measurement resolution for measuring power of the variable wavelength filter 33 is higher than the slot width (i.e., a measurement interval is narrow), there is a possibility that power of optical signals at a plurality of frequencies in one slot width may be measured by the PD 34. In such a case, a plurality of optical signals are detected in the slot width, which may lead to an erroneous recognition of the optical signals in one channel as optical signals in a plurality of channels. On the contrary, when the measurement resolution is lower than the slot width, there is a possibility that optical signals in all channels may not be detected.

For example, in the 50 GHz grid, when the measurement resolution of the variable wavelength filter 33 is 6.25 GHz and the slot width is 50 GHz which is equal to the center frequency interval, the OCM 32 measures power of optical signals at intervals of 6.25 GHz. For example, the OCM 32 detects signals at [+25 GHz, +18.75 GHz, +12.5 GHz, +6.25 GHz, 0 GHz, −6.25 GHz, −12.5 GHz, −18.75 GHz, and −25 GHz] based on a certain frequency. Accordingly, there is a possibility that the OCM 32 may erroneously recognize signals in one channel as signals in nine channels. On the other hand, when the measurement resolution of the OCM is increased to, for example, 50 GHz or higher so as to prevent an erroneous detection of channels, the optical signals obtained by performing wavelength multiplexing on the signal channels of the 37.5 GHz grid cannot be accurately detected.

Further, although PTL 1 and PTL 2 both describe techniques for monitoring optical signals, it is difficult for these techniques to detect optical power for each channel in a WDM signal in which frequency grids having different center frequency intervals coexist.

Object of Invention

An object of the present invention is to provide a technique for detecting optical power for each channel in a WDM signal in which frequency grids having different center frequency intervals coexist.

Solution to Problem

A signal detection device according to the present invention includes: a comparison means for acquiring data including center frequencies of optical signals respectively transmitted by a plurality of optical transmitters and a center frequency interval indicating an interval of the center frequencies, a power measurement value obtained by measuring power of a WDM (wavelength division multiplexing) signal obtained by performing wavelength multiplexing on the optical signals at frequencies of sampling points arranged at a predetermined sampling interval, the sampling interval, and the frequencies of the sampling points, selecting a selection value from the power measurement values based on the center frequency interval and the sampling interval, and outputting a result of comparison between the selection value and a predetermined threshold; and an alarm generation means for issuing a signal interruption alarm when the comparison result indicates that the selection value is less than the threshold.

A signal detection method according to the present invention includes: acquiring data including center frequencies of optical signals respectively transmitted by a plurality of optical transmitters and a center frequency interval indicating an interval of the center frequencies, a power measurement value obtained by measuring power of a WDM (wavelength division multiplexing) signal obtained by performing wavelength multiplexing on the optical signals at frequencies of sampling points arranged at a predetermined sampling interval, the sampling interval, and the frequencies of the sampling points, selecting a selection value from the power measurement values based on the center frequency interval and the sampling interval, and outputting a result of comparison between the selection value and a predetermined threshold; and issuing a signal interruption alarm when the comparison result indicates that the selection value is less than the threshold.

Advantageous Effects of Invention

The present invention provides an advantageous effect of detecting optical power for each channel in a WDM signal in which frequency grids having different center frequency intervals coexist.

DESCRIPTION OF EMBODIMENTS

Outline of Example Embodiments

In the following example embodiments, each transmitter transmits, to a signal detection unit, data on a center frequency of a channel in an optical signal transmitted from the transmitter and a frequency grid with electric signals. Further, an OCM (optical channel monitor) transmits, to the signal detection unit, data on a frequency scanned by the OCM and power and a sampling interval of detected optical signals with electric signals. The signal detection unit compares the data acquired from the transmitter with the data acquired from the OCM, and extracts, from the data acquired from the OCM, the measurement value of the power corresponding to the center frequency of the optical signal transmitted from the transmitter. The signal detection unit then outputs a signal interruption alarm when the extracted power measurement value is less than a signal interruption alarm threshold.

In the following example embodiments, the signal detection unit may include a CPU (central processing unit) and a memory. The memory is a non-transitory recording medium for recording programs. The CPU may implement functions of the signal detection unit by executing the programs recorded in the memory.

First Example Embodiment

Figure 1:
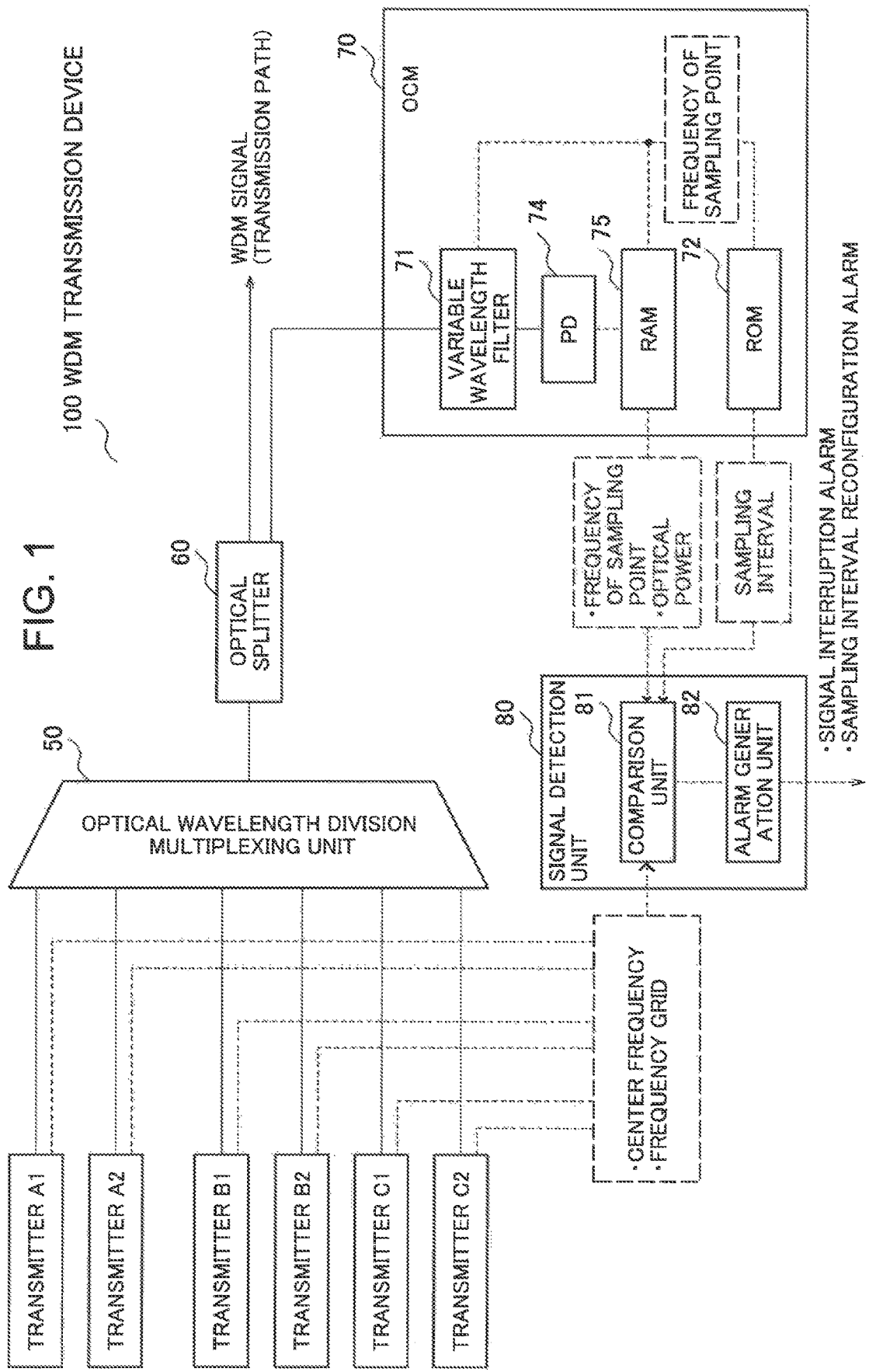
FIG. 1 is a block diagram illustrating a configuration of a WDM transmission device according to a first example embodiment.
Figure 4:
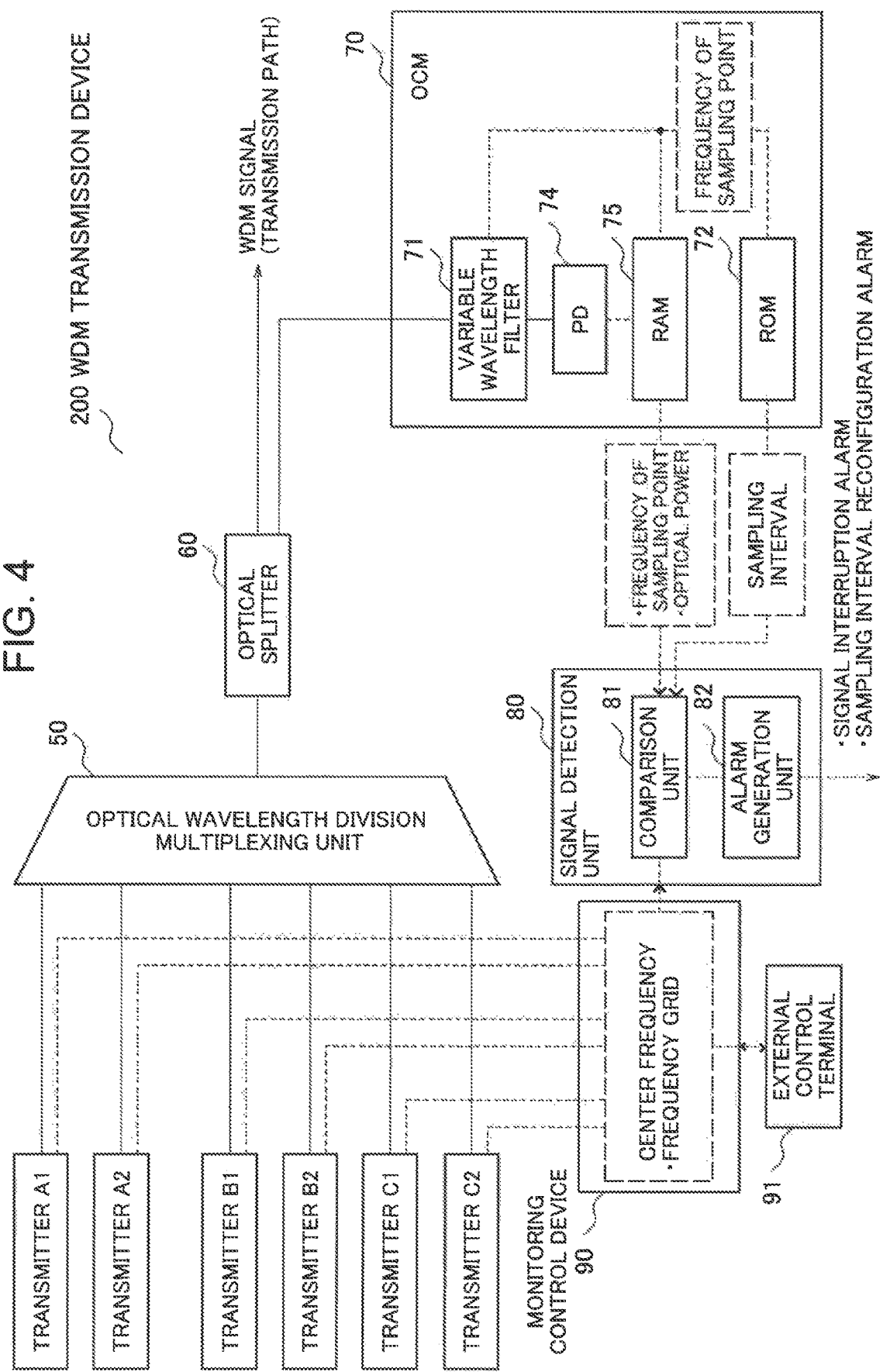
FIG. 4 is a block diagram illustrating a configuration of a WDM transmission device according to a second example embodiment.
Figure 5:
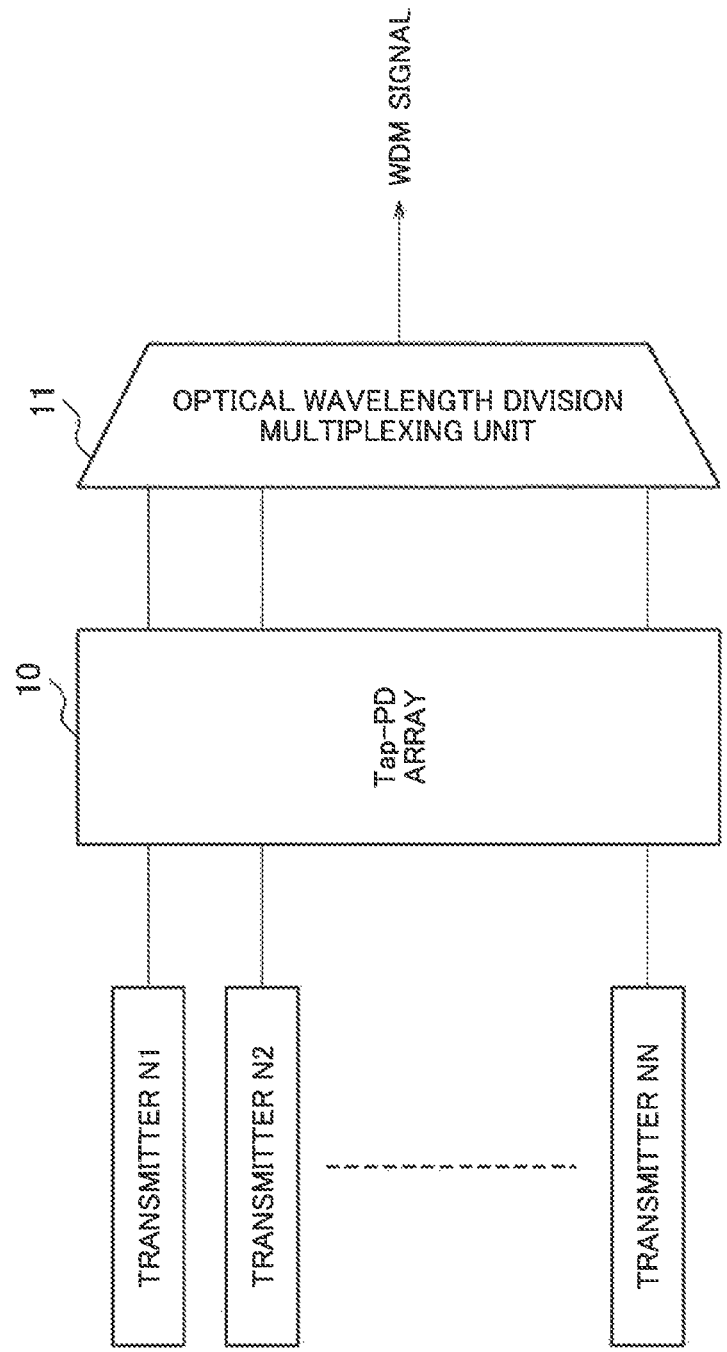
FIG. 5 is a diagram illustrating a signal detection method using Tap-PD.
Figure 6:
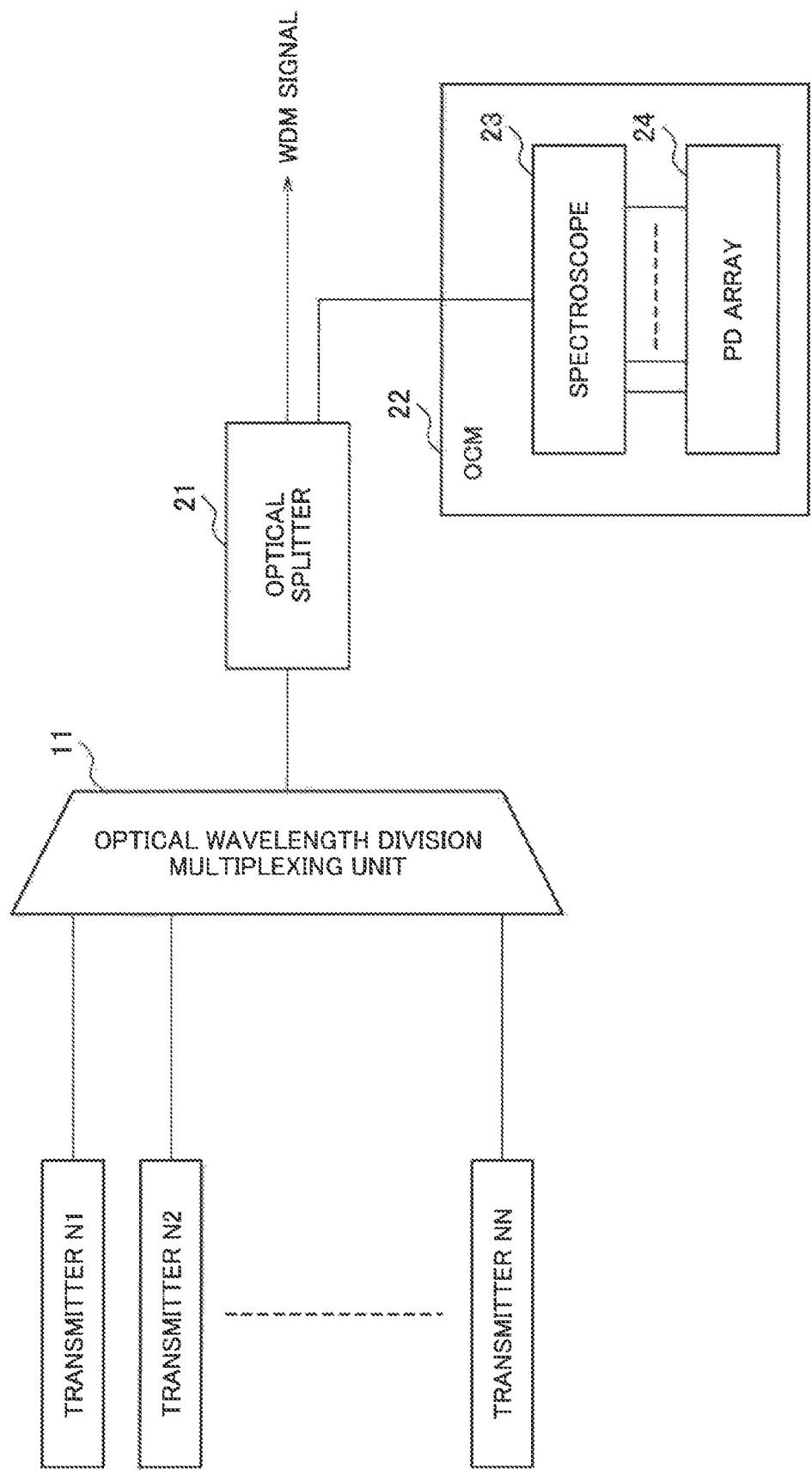
FIG. 6 is a diagram illustrating a signal detection method using a spectroscopic OCM.
Figure 7:
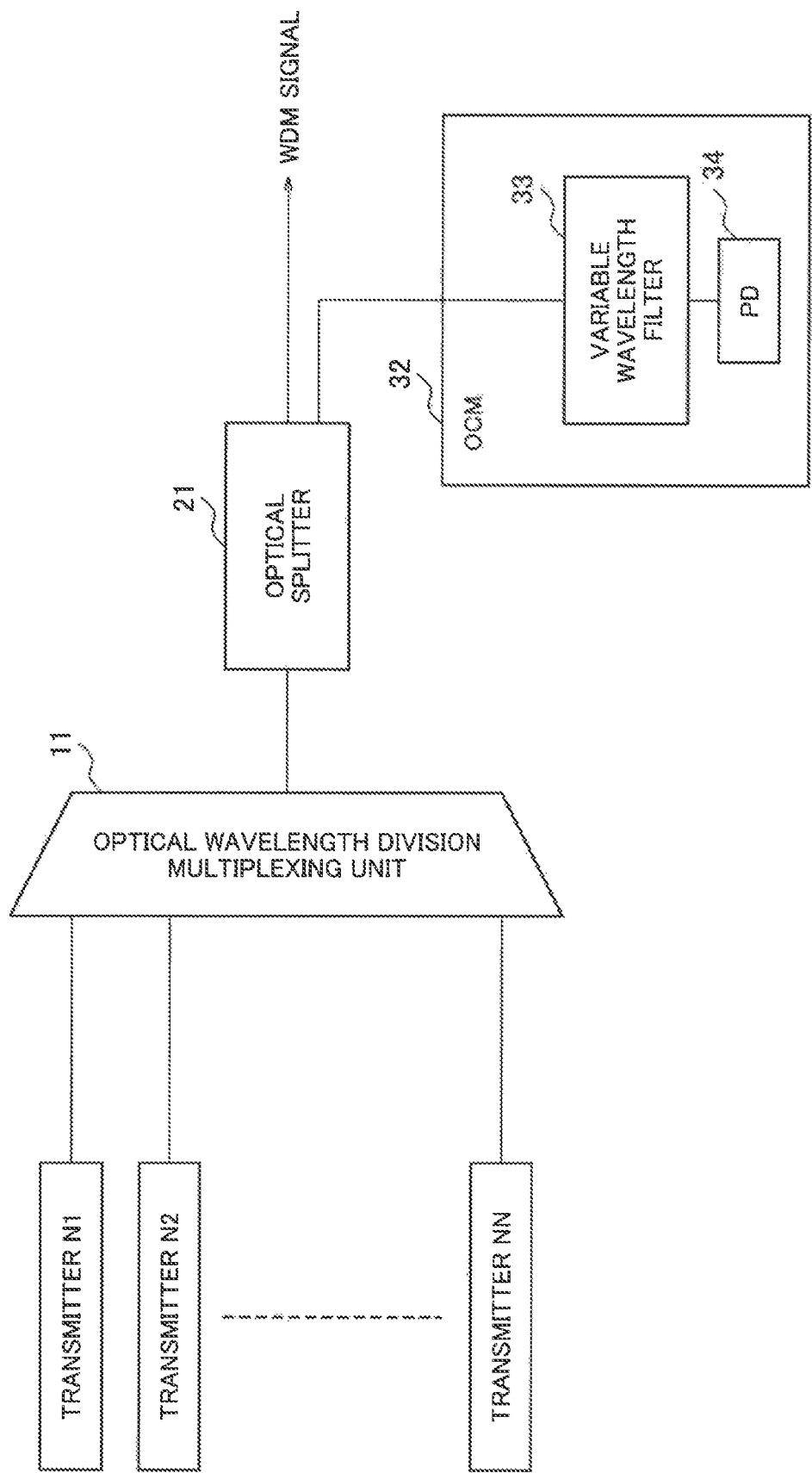
FIG. 7 is a diagram illustrating a signal detection method using a variable wavelength filter OCM.

FIG. 1 is a block diagram showing a configuration of a WDM transmission device 100 according to a first example embodiment of the present invention. The WDM transmission device 100 includes transmitters A1, A2, B1, B2, C1, and C2, an optical wavelength multiplexing unit 50, an optical splitter 60, an OCM 70, and a signal detection unit 80. Note that optical signals transmitted from the transmitters A1, A2, B1, B2, C1, and C2 are referred to as optical signals A1, A2, B1, B2, C1, and C2, respectively, in the following. Further, A1, A2, B1, B2, C1, and C2 may be collectively referred to as A1 to C2. The transmitters A1 to C2 respectively transmit the optical signals A1 to C2 each having a single carrier. In FIGS. 1 and 4, solid lines indicate optical signals and dashed lines indicate electric signals.

The transmitters A1 and A2 generate optical signals of a 50 GHz grid. Specifically, the center frequency interval of the optical signals A1 and A2 is 50 GHz. The transmitters B1 and B2 generate optical signals of a 37.5 GHz grid. The transmitters C1 and C2 generate optical signals of a 40 GHz grid. The center frequencies of these optical signals are different from each other. In this example embodiment, the center frequencies of the transmitters A1, A2, B1, B2, C1, and C2 are 195.300 THz, 195.250 THz, 195.200 THz, 195.1625 THz, 195.140 THz, and 195.100 THz, respectively.

The optical wavelength multiplexing unit 50 performs wavelength multiplexing on the optical signals A1 to C2 in which these different frequency grids coexist. As the optical wavelength multiplexing unit 50, an AWG (arrayed waveguide grating) module, an optical coupler, an optical interleaver, a WSS (wavelength selective switch), or a device including a combination thereof may be used.

The optical signals A1 to C2, which are converted into WDM signals after the optical wavelength multiplexing unit 50 multiplexes the optical signals, are split into two signals by the optical splitter 60. One of the WDM signals split into two by the optical splitter 60 is output to a transmission path, and the other one of the WDM signals is output to the OCM 70. A split ratio of the optical splitter 60 between the transmission path and the OCM 70 is preferably about 9:1. However, the split ratio is not limited to this value.

The OCM 70 is an optical channel monitor. The OCM 70 includes a variable wavelength filter 71, a PD 74, a RAM 75, and a ROM 72. The RAM 75 is a random access memory and the ROM 72 is a read only memory.

The ROM 72 stores a sampling interval of the variable wavelength filter 71 and frequencies of sampling points. Since a frequency and a wavelength are easily convertible, data for sampling may be recorded in the form of either a frequency or a wavelength. The ROM 72 is normally used as a read only non-volatile memory, however, the content of the ROM 72 is overwritten when the setting of the OCM 72 is changed. The sampling point frequencies recorded in the ROM 72 are used for controlling the variable wavelength filter 71 and writing measurement data into the RAM 75. The ROM 72 and the RAM 75 are both devices including a function of recording data. However, the type of data stored in the ROM 72 and the RAM 75 and the allocation of the data are not limited to those described above.

The variable wavelength filter 71 transmits light having the sampling point frequencies recorded in the ROM 72 and causes the PD 74 to receive the light. The PD 74 is a photo diode and outputs an electric signal having an amplitude proportional to the power of the received light.

The power of an optical signal input to the OCM 70 is periodically scanned by the variable wavelength filter 71. The scanning is carried out at a wavelength corresponding to a sampling point frequency within a wavelength variable range (e.g., 1530 to 1570 nm) of the variable wavelength filter 71. Each sampling point frequency is a frequency at a power measurement point and is stored in the ROM 72. When the power is scanned, an electric signal having an amplitude proportional to the power at the sampling point frequency is output from the PD 74.

In this example embodiment, the frequency of the sampling point is 193.1+n×sampling interval [THz] (n is an integer). The sampling interval is an interval of transmission frequencies set in the variable wavelength filter 71. This example embodiment is based on an interval of 6.25 GHz, which is generally used in a flexible grid. However, the sampling interval may be set to a value different from 6.25 GHz. When the number of sampling points is reduced by increasing the sampling interval, an increase in the speed of the scanning process can be expected. On the other hand, when the sampling interval is reduced, the optical power can be measured more precisely. The sampling interval may be determined in consideration of the relation between frequency grids used in the transmitters A1 to C2.

The power measurement value of the optical signal and the frequency of the variable wavelength filter 71 (i.e., the frequency of the sampling point) during measurement are written into a specific address region of the RAM 75 as measurement data, every time when scanning of the OCM 70 is executed. The measurement data written into a specific address region of the RAM 75 and the sampling interval recorded in the ROM 72 are periodically read out from the signal detection unit 80. Further, the signal detection unit 80 may read out the sampling interval recorded in the ROM 72, triggered by any one of activation of the signal detection unit 80, activation of the OCM 70, and change of the sampling interval.

Further, the signal detection unit 80 acquires, from all transmitters, data on the center frequency and the frequency grid triggered by activation of the signal detection unit 80, activation of any one of the transmitters A1 to C2, or change of the center frequency. The data on the frequency grid includes the center frequency interval. The signal detection unit 80 may read out the data only from the section whose state is fluctuated among the OCM 70 and each of the transmitters A1 to C2.

As described above, the signal detection unit 80 acquires the data on the power measured by the OCM 70, the frequency of the sampling point corresponding to the measured power, the sampling interval of the variable wavelength filter 71, the center frequency of the transmitters A1 to C2, and the frequency grid. The signal detection unit 80 detects whether the optical signals A1 to C2 are present based on the data acquired from the OCM 70 and the data acquired from the transmitters A1 to C2, and outputs an alarm to the outside when a signal interruption by any one of the transmitters is detected.

The signal detection unit 80 includes a comparison unit 81 and an alarm generation unit 82. The comparison unit 81 compares the data acquired from the transmitters A1 to C2 with the data acquired from the OCM 70, and detects the presence or absence of the optical signals A1 to C2 in the following procedure.

The signal detection unit 80 first confirms if the frequency grid is disposed on the frequency of the sampling point of the variable wavelength filter 71. In this example embodiment, the frequency of each of the optical signals A1 and A2 is the 50 GHz grid, and the frequency of each of the optical signals B1 and B2 is the 37.5 GHz grid. All of these frequencies are disposed on the frequencies at a sampling interval of 6.25 GHz. The frequency grid set in the transmitters A1, A2, B1, and B2 is the 50 GHz grid or the 37.5 GHz grid. Accordingly, the signal detection unit 80 searches and selects the frequency of the sampling point matched with the center frequency of the optical signals A1, A2, B1, and B2 from the measurement data acquired from the RAM 75. Further, the signal detection unit 80 records the selected frequency and the optical power corresponding to the frequency in the signal detection unit 80 in such a way that they are linked to each other.

When each of the optical power corresponding to the selected frequencies of the sampling points is equal to or more than a predetermined alarm threshold, the alarm generation unit 82 determines that the optical signals A1, A2, B1, and B2 are normally transmitted from the transmitters A1, A2, B1, and B2, respectively. In this case, the alarm generation unit 82 does not issue an alarm. However, when the optical power of the frequency of any one of the sampling points is less than the alarm threshold, the alarm generation unit 82 issues a signal interruption alarm. The signal interruption alarm may be output together with information about the transmitter that causes the alarm, the frequency grid, and the center frequency.

On the other hand, since the frequency of each of the optical signals C1 and C2 is the 40 GHz grid, the center frequency of the optical signals C1 and C2 is not disposed on the grid of the sampling interval of 6.25 GHz in some cases. Accordingly, there is a case where the frequency of the sampling point matching with the frequency of the optical signals C1 and C2 does not exist.

In this case, if the center frequency interval is larger than the sampling interval to some extent, it can be expected that the frequency of the sampling point exist in the vicinity of the center frequency. The vicinity of the center frequency is, for example, a frequency range with a full width at half maximum of the power of the optical signals C1 and C2 at the center frequency. In addition, when the sampling interval is relatively narrow, the power of the optical signals C1 and C2 that is measured in the vicinity of the center frequency can be regarded as the power at the center frequency of the optical signals C1 and C2 even if the center frequency does not match with the frequency of the sampling point. In this example embodiment, when the center frequency interval is four times the sampling interval or more, it is determined that the frequency of the sampling point exists in the vicinity of the center frequency.

Specifically, the comparison unit 81 searches frequencies of sampling points at two locations adjacent on both sides of the center frequency of the transmitters C1 and C2 from the power measurement data obtained by the variable wavelength filter 71. Further, the comparison unit 81 records the searched frequencies and the power measurement values corresponding to the frequencies in such a way that they are linked to each other. The signal detection unit 80 may include a memory for recording the power measurement values therein.

A larger one of the power measurement values respectively corresponding to the frequencies at two sampling points adjacent on both sides of the center frequency is recorded in the signal detection unit 80. When the recorded power is larger than a predetermined signal interruption alarm threshold, it is determined that the optical signals from the transmitters are normally transmitted. In this case, the signal interruption alarm is not issued. When the recorded optical power is smaller than the alarm threshold, the signal interruption alarm is output.

Description of Operation of First Example Embodiment

Figure 2:
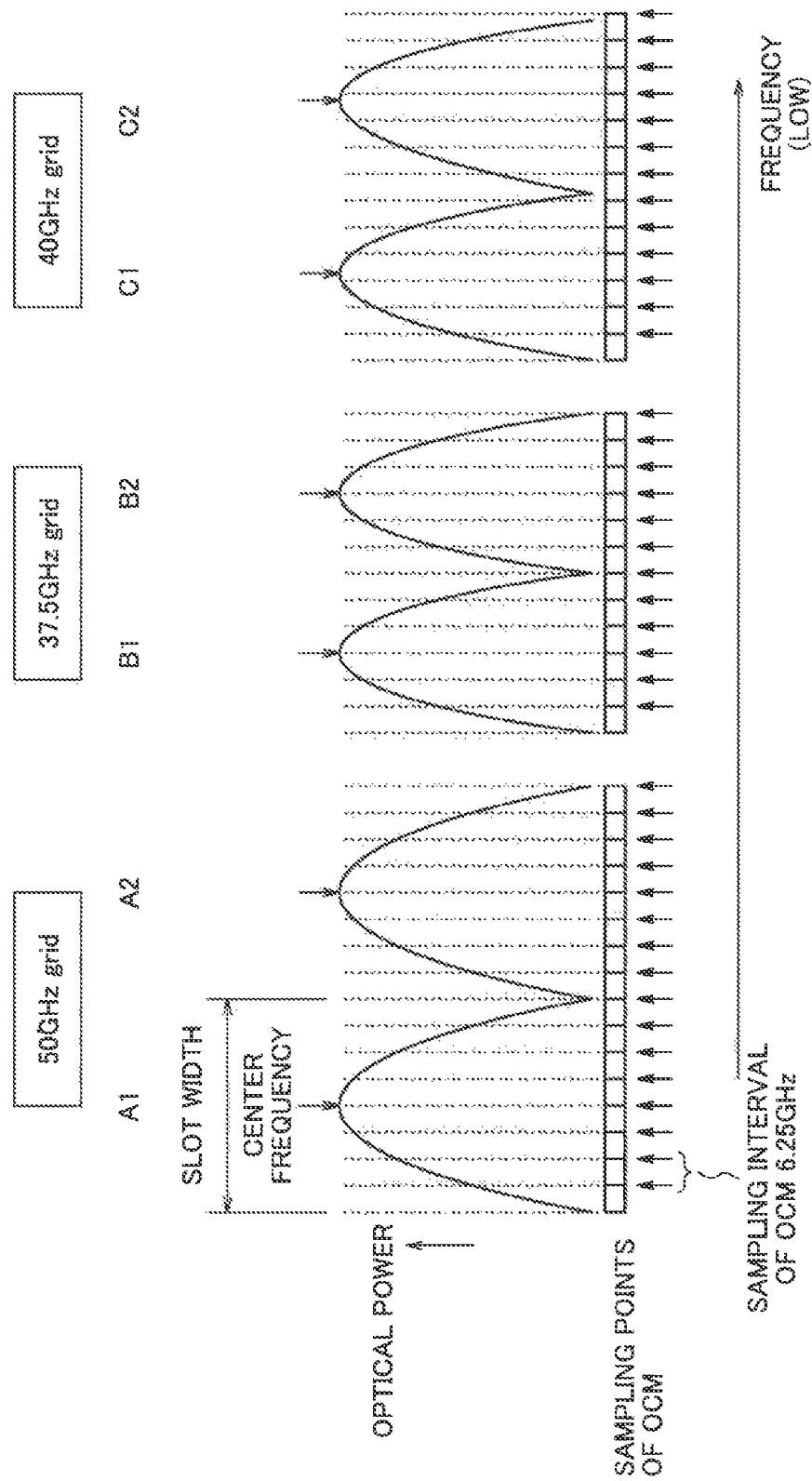
FIG. 2 is a diagram illustrating a measurement of an optical power by an OCM.

FIG. 2 is a diagram illustrating a measurement of an optical power by the OCM 70. A vertical axis in FIG. 2 represents the power of each of the optical signals A1 to C2. A horizontal axis in FIG. 2 represents the frequency of each of the optical signals A1 to C2, and the frequency decreases toward the right (i.e., the wavelength increases). A1 to C2 in FIG. 2 schematically show spectrum examples of the optical signals A1 to C2 that are transmitted by the transmitters A1 to C2, respectively, shown in FIG. 1. Referring to FIG. 2, the center frequency interval of each of the optical signals A1 and A2 is 50 GHz. The center frequency interval of each of the optical signals B1 and B2 is 37.5 GHz. The center frequency interval of each of the optical signals C1 and C2 is 40 GHz. As shown in FIG. 2, in this example embodiment, the slot width is substantially equal to the center frequency interval of the frequency grid to which each of the optical signals A1 to C2 belongs.

The optical power of the optical signal input to the OCM 70 is measured at a frequency of a sampling point. The frequency of each sampling point is represented by $193.1 + n \times 6.25$[THz] (n is an integer). The frequency of each sampling point is indicated by an upward arrow as a "sampling point of OCM" in FIG. 2. During the measurement of the power of the optical signals A1 to C2, the transmission frequency of the variable wavelength filter 71 is set to the frequency of the sampling point. The PD 74 outputs an electric signal having an amplitude proportional to the power of the received light at the frequency of the sampling point.

Figure 3:
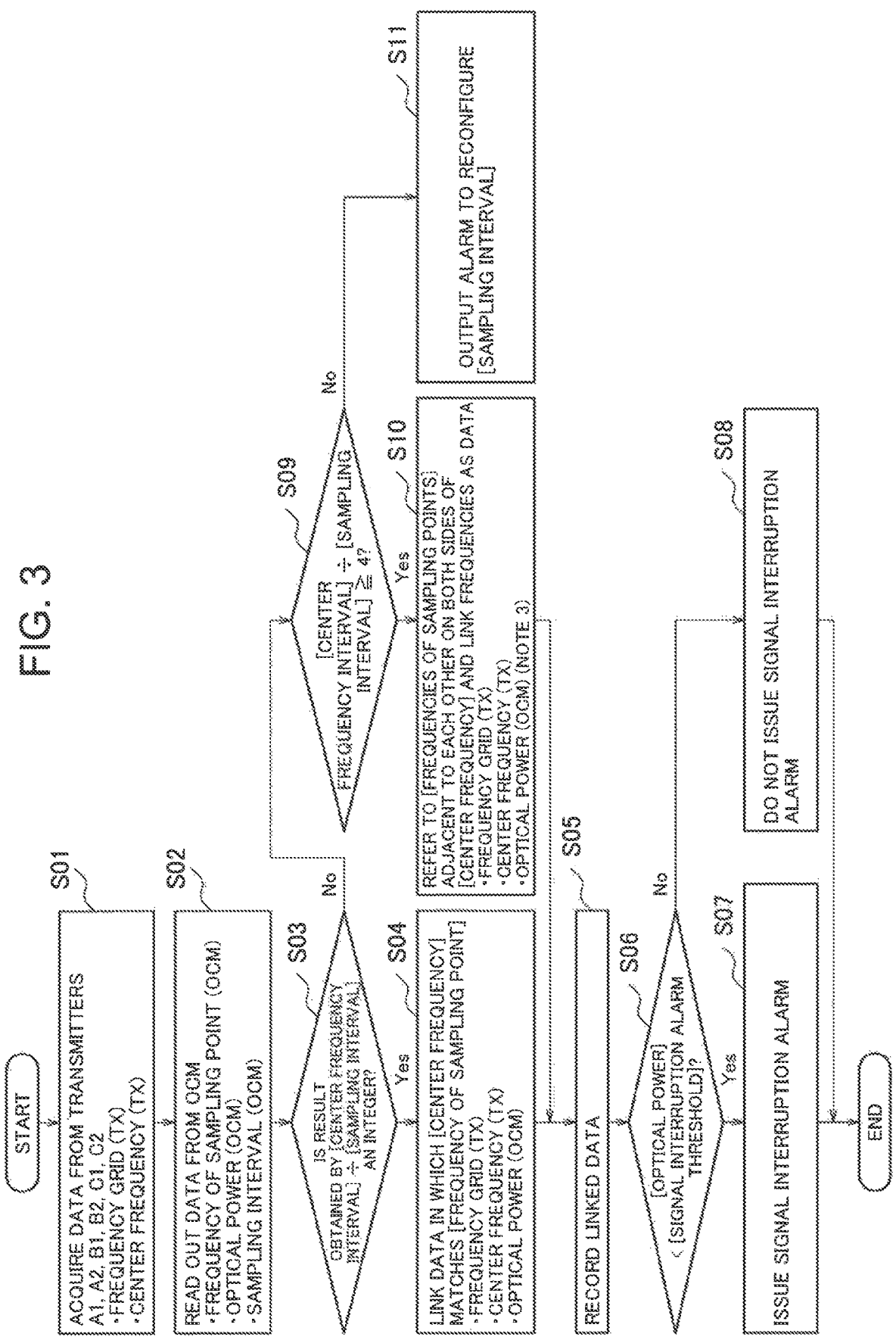
FIG. 3 is a flowchart illustrating an example of a process of a signal detection unit according to the first example embodiment.

FIG. 3 is a flowchart showing an example of a process of the signal detection unit 80. In the description of FIG. 3, data acquired from the transmitters A1 to C2 is denoted by (TX) and data acquired from the OCM 70 is denoted by (OCM).

The signal detection unit 80 acquires, from the transmitters A1 to C2, data on the center frequency (TX) and the frequency grid (TX), triggered by activation of the signal detection unit 80, activation of any one of the transmitters A1 to C2, or change of the center frequency (step S01 shown in FIG. 3). Data on the frequency grid (TX) includes the center frequency interval.

Further, the signal detection unit 80 reads out the sampling interval (OCM) from the ROM 72, triggered by any one of activation of the signal detection unit 80, activation of the OCM 70, and change of the sampling interval (S02). In this example embodiment, the sampling interval (OCM) is 6.25 GHz. Furthermore, the signal detection unit 80 periodically reads out the frequency (OCM) of the sampling point of the RAM 75 and the optical power (OCM) corresponding to the frequency (S02). The signal detection unit 80 acquires the above-mentioned data from the transmitters A1 to C2 and the OCM 70 in steps S01 and S02, and then detects whether or not the optical signals A1 to C2 are present.

To confirm whether or not the center frequency (TX) in the frequency grid is disposed on the frequency (OCM) of the sampling point, the signal detection unit 80 divides the center frequency interval (TX) included in the data (TX) of the frequency grid by the sampling interval (OCM) (S03). When the division result (quotient) is an integer (S03: Yes), the signal detection unit 80 determines that the center frequency is disposed on the sampling interval.

For example, the result of dividing the center frequency interval (TX) of 50 GHz of the optical signals A1 and A2 by the sampling interval (OCM) of 6.25 GHz and the result of dividing the center frequency interval (TX) of 37.5 GHz of the optical signals B1 and B2 by the sampling interval (OCM) of 6.25 GHz are both integers. Accordingly, the result of step S03 indicates "Yes".

When the result of step S03 is "Yes", the signal detection unit 80 searches data in which the center frequency (TX) matches with the frequency (OCM) of the sampling point, and selects the data. Further, the signal detection unit 80 records the selected data in the signal detection unit 80 in such a way that the selected data is linked to the center frequency (TX), the center frequency interval (TX), and the optical power (OCM) (steps S04 to S05).

The signal detection unit 80 compares the recorded optical power (OCM) with the predetermined alarm threshold (S06). When the recorded optical power (OCM) is less than the alarm threshold (S06: Yes), the signal detection unit 80 determines that a signal interruption has occurred, and issues the signal interruption alarm (S07). The signal interruption alarm may include information about the frequency grid (TX) and the center frequency (TX). When the recorded optical power (OCM) is equal to or larger than the alarm threshold, the signal detection unit 80 determines that the optical signals transmitted from the transmitters are normal, and does not issue the signal interruption alarm (S08). The alarm threshold may be set to a different value for each center frequency, or may be set to a constant value.

On the other hand, in step S03, the quotient obtained by dividing the center frequency interval (TX) of 40 GHz of the optical signals C1 and C2 by the sampling interval (OCM) of 6.25 GHz is not an integer. In this case, the result of step S03 indicates "No". Then, it is determined whether the center frequency interval is four times the sampling interval or more (S09). In this example, the quotient obtained by dividing the center frequency interval (TX) of 40 GHz by the sampling interval (OCM) of 6.25 GHz is equal to or greater than 4 (S09: Yes).

In step S09, it is determined whether the sampling interval (OCM) is sufficiently narrower than the slot width (substantially equal to the center frequency interval). Specifically, as mentioned above, when the center frequency interval (TX) is four times the sampling interval (OCM) or more (S09: Yes), it is considered that there is no large error even when the power at the frequency of the sampling point in the vicinity of the center frequency is regarded as the power of each of the optical signals C1 and C2. In this case, in step S10, even when the center frequency does not match with the frequency of the sampling point, the power of each of the optical signals C1 and C2 that is measured in the vicinity of the center frequency is regarded as the power at the center frequency of the optical signals C1 and C2.

In this example embodiment, when the result of step S09 is "Yes", one of the optical power (OCM) of the frequencies (OCM) adjacent on both sides of the center frequency is used as the optical power of the center frequency of the optical signals C1 and C2. Accordingly, a larger one of the optical power at the frequencies of the sampling points before and after the center frequency is set as the power of the optical signal at the center frequency. This is because the peak of the power of the optical signal is generally highest at the center frequency, and thus it is considered that as the measured power becomes higher, the power is closer to the peak value. The process of step S10 and subsequent steps is similar to step S05.

In step S09, there is described a case where the sampling interval (OCM) is 12.5 GHz. The process for the optical signals A1, A2, B1, and B2 is similar to the above-described procedure. However, in the optical signals C1 and C2, the result (40 GHz÷12.5 GHz) of dividing the center frequency interval (TX) by the sampling interval (OCM) is less than 4 (S09: No). Specifically, when the sampling interval (OCM) is 12.5 GHz, it cannot be determined that the sampling interval is sufficiently smaller than the signal spectrum width. Accordingly, the signal detection unit 80 outputs an alarm to prompt reconfiguration of the sampling interval (OCM) (S11). The alarm to prompt reconfiguration of the sampling interval may indicate that, for example, the sampling interval is set to one-fourth or less of the center frequency interval.

Note that in step S04, if there is a deviation between the center frequency and the frequency of the sampling point due to some reasons, there is a possibility that data in which the center frequency (TX) matches with the frequency (OCM) of the sampling point does not exist. In this case, the flow may shift from step S04 to step S09. Then, when the determination result in step S09 is "Yes", a process similar to the process of step S10 performed when the center frequency (TX) and the frequency (OCM) of the sampling point do not match is executed. In this process, in spite of the fact that the quotient obtained by dividing the center frequency interval by the sampling interval is an integer, the power of the optical signal can be detected even when there is a deviation between the center frequency and the frequency of the sampling point.

As described above, in the WDM transmission device 100 of the first example embodiment, the signal detection unit 80 acquires, from the OCM 70, data on the frequency of the sampling point, the measurement value of the power of the optical signal, and the sampling interval. Further, the signal detection unit 80 acquires data on the frequency grid and the center frequency from the transmitters A1 to C2. Furthermore, based on the acquired data, the signal detection unit 80 can detect whether or not the optical signals A1 to C2 are transmitted from the WDM transmission device.

Moreover, the signal detection unit 80 confirms whether or not the center frequency of the optical signals A1 to C2 is disposed on the sampling interval of the OCM 70, thereby making it possible to accurately detect the optical signals A1 to C2 even when different frequency grids are used in a mixed state.

Specifically, the signal detection unit 80 divides the center frequency interval by the sampling interval. When the quotient is an integer, the signal detection unit 80 determines that the center frequency is disposed on the frequency of the sampling interval, and directly compares the measurement value of the optical power of the OCM 70 with the signal interruption alarm threshold. On the other hand, when the quotient is not an integer and the value of the quotient is equal to or greater than a predetermined value, the signal detection unit 80 regards a larger one of the power measurement values of the frequencies adjacent before and after the center frequency as the measurement value at the center frequency. The signal detection unit 80 then compares the measurement value with the signal interruption alarm threshold, and determines whether or not the optical signal is present.

Note that in the case where the signal detection unit 80 selects the optical power measurement value, when the sampling interval is relatively larger than the center frequency interval, the signal detection unit 80 may output an alarm to prompt reconfiguration of the sampling interval.

Further, the sampling interval is determined in consideration of the center frequency interval of each transmitter and the number of sampling points is increased or reduced, to thereby make it possible to optimize the processing speed of each of the OCM 70 and the signal detection unit 80.

Minimum Configuration of First Example Embodiment

Advantageous effects obtained by the WDM transmission device 100 of the first example embodiment described above with reference to FIGS. 1 to 3 can also be obtained by a signal detection device described below. The signal detection device corresponds to the signal detection unit 80 shown in FIG. 1.

The signal detection device includes a comparison unit 81 and an alarm generation unit 82. The comparison unit acquires data including "center frequencies" of optical signals transmitted by a plurality of optical transmitters and "a center frequency interval" indicating an interval of the center frequencies.

The comparison unit further acquires "a power measurement value" obtained by measuring the power of the WDM signal obtained by performing wavelength multiplexing on the optical signals at the frequencies of the sampling points arranged at a predetermined sampling interval, "a sampling interval", and "frequencies of sampling points". Further, the comparison unit selects a selection value from the power measurement values based on the center frequency interval and the sampling interval, and outputs a result of comparison between the selection value and a predetermined threshold.

The alarm generation unit 82 issues the signal interruption alarm when the comparison result of the comparison unit indicates that the selection value is less than the threshold.

The signal detection device having the configuration as described above acquires data on the frequencies of the sampling points, the power measurement value of the optical signals, and the sampling interval, in the same manner as in the signal detection unit 80 described above. Further, the signal detection device acquires data on the center frequency and the center frequency interval. Furthermore, the signal detection device executes the procedure shown in FIG. 3, thereby making it possible to detect whether or not the WDM transmission device is transmitting optical signals based on the acquired data.

Second Example Embodiment

FIG. 4 is a block diagram showing a configuration of a WDM transmission device 200 according to a second example embodiment of the present invention. The WDM transmission device 200 differs from the WDM transmission device 100 of the first example embodiment in that the WDM transmission device 200 further includes a monitoring control device 90 and an external control terminal 91. In the WDM transmission device 200, setting of the transmitters A1 to C2 is performed by the monitoring control device 90. The external control terminal 91 is a terminal for an operator to set data on the transmitters A1 to C2 in the monitoring control device 90. When the monitoring control device 90 transmits the set data to the transmitters A1 to C2, while adding or deleting transmitters or changing the setting of transmitters, the monitoring control device 90 transmits data on the center frequency and the center frequency interval included in the set data to the signal detection unit 80. Until the monitoring control device 90 changes the set data of each transmitter, the signal detection unit 80 holds the previous set data on the transmitters A1 to C2. Further, upon activation of the signal detection unit 80, the signal detection unit 80 may acquire the set data on each transmitter from the monitoring control device 90. The other configuration and operation of the WDM transmission device 200 are similar to those of the WDM transmission device 100 of the first example embodiment.

In the WDM transmission device 200 of the second example embodiment having the configuration as described above, it is not necessary for the signal detection unit 80 to access the transmitters A1 to C2 to read out the data in order to acquire the data on the transmitters A1 to C2. Accordingly, even when the setting of each transmitter is changed, the signal detection unit 80 may acquire the data from the monitoring control device 90. This eliminates the need for providing a data path connected to the changed transmitter.

Note that the monitoring control device 90 and the external control terminal 91 may be configured as independent devices that are connected to the outside of the WDM transmission device 200. The monitoring control device 90 may be a server device whose functions are implemented by a program, and the external control terminal 91 may be a terminal for operating the server device.

Note that the example embodiments of the present invention can be described as, but not limited to, the following supplementary notes.

(Supplementary Note 1)

A signal detection device including:

comparison means for acquiring data including center frequencies of optical signals respectively transmitted by a plurality of optical transmitters and a center frequency interval indicating an interval of the center frequencies, a power measurement value obtained by measuring power of a WDM (wavelength division multiplexing) signal obtained by performing wavelength multiplexing on the optical signals at frequencies of sampling points arranged at a predetermined sampling interval, the sampling interval, and the frequencies of the sampling points, selecting a selection value from the power measurement values based on the center frequency interval and the sampling interval, and outputting a result of comparison between the selection value and a predetermined threshold; and alarm generation means for issuing a signal interruption alarm when the comparison result indicates that the selection value is less than the threshold.

(Supplementary Note 2)

The signal detection device according to Supplementary Note 1, wherein the comparison means selects, as the selection value, the power measurement value at the frequency of the sampling point matching with the center frequency, when a quotient obtained by dividing the center frequency interval by the sampling interval is an integer.

(Supplementary Note 3)

The signal detection device according to Supplementary Note 2, wherein when the power measurement value at the frequency of the sampling point matching with the center frequency does not exist, the comparison means selects, as the selection value, a larger one of the power measurement values at the frequencies of the sampling points adjacent on both sides of the center frequency.

(Supplementary Note 4)

The signal detection device according to any one of Supplementary Notes 1 to 3, wherein when a quotient obtained by dividing the center frequency interval by the sampling interval is not an integer and the quotient obtained by dividing the center frequency interval by the sampling interval is equal to or greater than a predetermined value, the comparison means selects, as the selection value, a larger one of the power measurement values at the frequencies of the sampling points adjacent on both sides of the center frequency.

(Supplementary Note 5)

The signal detection device according to any one of Supplementary Notes 1 to 4, wherein when a quotient obtained by dividing the center frequency interval by the sampling interval is not an integer and the quotient obtained by dividing the center frequency interval by the sampling interval is less than a predetermined value, the comparison means causes the alarm generation means to issue an alarm to prompt reconfiguration of the sampling interval.

(Supplementary Note 6)

A WDM transmission device including:

an optical transmitter;

an optical wavelength multiplexing unit for performing wavelength multiplexing on light transmitted from the optical transmitter and outputting a WDM signal;

an OCM (optical channel monitor) for measuring power of the WDM signal at a frequency of a sampling point and generates the power measurement value; and the signal detection device according to any one of Supplementary Notes 1 to 5, the signal detection device being configured to acquire, from the OCM, the power measurement value, the sampling interval, and the frequency of the sampling point.

(Supplementary Note 7)

The WDM transmission device according to Supplementary Note 6, wherein the OCM includes:

a variable wavelength filter for allowing the WDM signal having the frequency of the sampling point to pass;

a light receiving element for outputting an electric signal having an amplitude corresponding to power of an optical signal output from the variable wavelength filter; and recording means for recording the power measurement value based on the frequency of the sampling point, the sampling interval, and the electric signal, and the comparison means acquires the power measurement value, the sampling interval, and the frequency of the sampling point from the recording means.

(Supplementary Note 8)

The WDM transmission device according to Supplementary Note 6 or 7, wherein the comparison means acquires data including the center frequency and the frequency grid from the optical transmitter.

(Supplementary Note 9)

The WDM transmission device according to Supplementary Note 6 or 7, further including monitoring control means for controlling the optical transmitter, wherein the signal detection device acquires data including the center frequency and the frequency grid from the monitoring control device.

(Supplementary Note 10)

A signal detection method including:

acquiring data including center frequencies of optical signals respectively transmitted by a plurality of optical transmitters and a center frequency interval indicating an interval of the center frequencies, a power measurement value obtained by measuring power of a WDM (wavelength division multiplexing) signal obtained by performing wavelength multiplexing on the optical signals at frequencies of sampling points arranged at a predetermined sampling interval, the sampling interval, and the frequencies of the sampling points, and selecting a selection value from the power measurement values based on the center frequency interval and the sampling interval, and outputting a result of comparison between the selection value and a predetermined threshold; and issuing a signal interruption alarm when the comparison result indicates that the selection value is less than the threshold.

(Supplementary Note 11)

A control program for a signal detection device, the control program causing a computer of the signal detection device to execute procedures of:

acquiring data including center frequencies of optical signals respectively transmitted by a plurality of optical transmitters and a center frequency interval indicating an interval of the center frequencies, a power measurement value obtained by measuring power of a WDM (wavelength division multiplexing) signal obtained by performing wavelength multiplexing on the optical signals at frequencies of sampling points arranged at a predetermined sampling interval, the sampling interval, and the frequencies of the sampling points;

selecting a selection value from the power measurement values based on the center frequency interval and the sampling interval;

outputting a result of comparison between the selection value and a predetermined threshold; and issuing a signal interruption alarm when the comparison result indicates that the selection value is less than the threshold.

While the present invention has been described above with reference to example embodiments, the present invention is not limited to the above-described example embodiments and modified examples. The configuration and details of the present invention can be modified in various ways that can be understood by those skilled in the art within the scope of the present invention. For example, the configurations of each of the example embodiments can be applied not only to land optical communication systems, but also to submarine optical cable communication systems.

This application is based upon and claims the benefit of priority from Japanese Patent Application No. 2014-195313, filed on Sep. 25, 2014, the disclosure of which is incorporated herein in its entirety.

REFERENCE SIGNS LIST 100, 200 WDM transmission device
10 Tap-PD array
11, 50 Optical wavelength multiplexing unit
21, 60 Optical splitter
22, 32, 70 OCM
23 Spectroscope
24 PD array
33, 71 Variable wavelength filter
72 ROM
34, 74 PD
75 RAM
80 Signal detection unit
81 Comparison unit
82 Alarm generation unit
90 Monitoring control device
91 External control terminal
N1-NN Transmitter
A1, A2, B1, B2, C1, C2 Transmitter or Optical signal

The invention claimed is:

1. An optical signal monitoring apparatus comprising:
an optical channel monitor configured to measure a plurality of optical intensity values of a multiplexed signal at a sampling interval, the multiplexed signal including a first optical signal having a first frequency width and a second optical signal having a second frequency width; and
a controller configured to:
identify first sampling points corresponding to the first optical signal and second sampling points corresponding to the second optical signal; and
identify first intensity values corresponding to the first optical signal and second intensity values corresponding to the second optical signal from the plurality of measured optical intensity values, the first intensity values being identified based on the first sampling points and the second intensity values being identified based on the second sampling points.

2. The optical signal monitoring apparatus of claim 1, wherein the first frequency width and the second frequency width are variable.

3. The optical signal monitoring apparatus of claim 1, wherein the sampling interval is variable.

4. The optical signal monitoring apparatus of claim 1, wherein the first frequency width and the second frequency width are different.

5. The optical signal monitoring apparatus of claim 1, wherein the controller is further configured to identify a first optical channel power corresponding to the first optical signal based on the first intensity values.

6. An optical signal monitoring apparatus comprising:
an optical channel monitor configured to measure a plurality of optical intensity values of a multiplexed signal at a sampling interval, the multiplexed signal including a first optical signal having a first frequency width and a second optical signal having a second frequency width; and
a controller configured to:
identify first intensity values corresponding to the first optical signal and second intensity values corresponding to the second optical signal from the plurality of measured optical intensity values;
identify a first optical channel power corresponding to the first optical signal based on the first intensity values; and
output a first indication signal when the first optical channel power is less than a first threshold.

7. The optical signal monitoring apparatus of claim 6, wherein the controller is further configured to identify a second optical channel power corresponding to the second optical signal based on the second intensity values.

8. The optical signal monitoring apparatus of claim 7, wherein the controller is further configured to output a second indication signal when the second optical channel power is less than a second threshold.

9. The optical signal monitoring apparatus of claim 1, further comprising a multiplexer configured to multiplex the first optical signal and the second optical signal to generate the multiplexed signal.

10. The optical signal monitoring apparatus of claim 9, further comprising a first transmitter configured to transmit the first optical signal.

11. The optical signal monitoring apparatus of claim 10, further comprising a second transmitter configured to transmit the second optical signal.

12. An optical signal monitoring method comprising:
measuring a plurality of optical intensity values of a multiplexed signal at a sampling interval, the multiplexed signal including a first optical signal having a first frequency width and a second optical signal having a second frequency width;
identifying first sampling points corresponding to the first optical signal and second sampling points corresponding to the second optical signal; and
identifying first intensity values corresponding to the first optical signal and second intensity values corresponding to the second optical signal from the plurality of measured optical intensity values, the first intensity values being identified based on the first sampling points and the second intensity values being identified based on the second sampling points.

13. The optical signal monitoring method of claim 12, wherein the first frequency width and the second frequency width are variable.

14. The optical signal monitoring method of claim 12, wherein the first frequency width and the second frequency width are different.

15. The optical signal monitoring method of claim 12, further comprising identifying a first optical channel power corresponding to the first optical signal based on the first intensity values.

16. The optical signal monitoring method of claim 15, further comprising outputting a first indication signal when the first optical channel power is less than a first threshold.

17. The optical signal monitoring method of claim 12, further comprising multiplexing the first optical signal and the second optical signal to generate the multiplexed signal.

18. A non-transitory computer readable recording medium having embodied thereon a program, which when executed by a processor of an optical signal monitoring apparatus, causes the optical signal monitoring apparatus to execute an optical signal monitoring method, the optical signal monitoring method including:
  measuring a plurality of optical intensity values of a multiplexed signal at a sampling interval, the multiplexed signal including a first optical signal having a first frequency width and a second optical signal having a second frequency width;
  identifying first sampling points corresponding to the first optical signal and second sampling points corresponding to the second optical signal; and
  identifying first intensity values corresponding to the first optical signal and second intensity values corresponding to the second optical signal from the plurality of measured optical intensity values, the first intensity values being identified based on the first sampling points and the second intensity values being identified based on the second sampling points.

* * * * *